US012035749B2

(12) United States Patent
Sur

(10) Patent No.: US 12,035,749 B2
(45) **Date of Patent: *Jul. 16, 2024**

(54) AEROSOL DELIVERY DEVICE, AND ASSOCIATED APPARATUS AND METHOD OF FORMATION THEREOF

(71) Applicant: RAI STRATEGIC HOLDINGS, INC., Winston-Salem, NC (US)

(72) Inventor: Rajesh Sur, Winston-Salem, NC (US)

(73) Assignee: RAI STRATEGIC HOLDINGS, INC., Winston-Salem, NC (US)

( * ) Notice: Subject to any disclaimer, the term of this patent is extended or adjusted under 35 U.S.C. 154(b) by 724 days.

This patent is subject to a terminal disclaimer.

(21) Appl. No.: 17/186,978

(22) Filed: Feb. 26, 2021

(65) Prior Publication Data

US 2021/0185770 A1 Jun. 17, 2021

Related U.S. Application Data

(63) Continuation of application No. 16/038,991, filed on Jul. 18, 2018, now Pat. No. 10,945,457, which is a (Continued)

(51) Int. Cl.
*A24F 40/46* (2020.01)
*A24F 40/70* (2020.01)
(Continued)

(52) U.S. Cl.
CPC .............. *A24F 40/46* (2020.01); *A24F 40/70* (2020.01); *H05B 3/0014* (2013.01); *H05B 3/145* (2013.01);
(Continued)

(58) Field of Classification Search
None
See application file for complete search history.

(56) References Cited

U.S. PATENT DOCUMENTS 1,771,366 A 7/1930 Wyss et al.
2,057,353 A 10/1936 Whittemore, Jr.
(Continued)

FOREIGN PATENT DOCUMENTS

AU 276250 7/1965
CA 2 641 869 5/2010
(Continued)

*Primary Examiner* — James Harvey
(74) *Attorney, Agent, or Firm* — Womble Bond Dickinson (US) LLP

(57) ABSTRACT

An aerosol delivery device is provided, and includes a control body serially engaged with a cartridge, the cartridge having an aerosol precursor source housing an aerosol precursor and defining a mouth opening configured to direct an aerosol therethrough to a user. A heater device is operably engaged with the cartridge, wherein the heater device comprises an electrically-conductive carbon element disposed adjacent to a heat-conductive substrate. The heater device is configured to receive the aerosol precursor from the aerosol precursor source onto the heat-conductive substrate, such that the aerosol precursor on the heat-conductive substrate forms the aerosol in response to heat from the electrically-conductive carbon element conducted through the heat-conductive substrate. An associated apparatus and method are also provided.

38 Claims, 5 Drawing Sheets

Related U.S. Application Data continuation of application No. 15/133,916, filed on Apr. 20, 2016, now Pat. No. 10,028,534.

(51) Int. Cl.

| | |
|---|---|
| ***H05B 3/00*** | (2006.01) |
| ***H05B 3/14*** | (2006.01) |
| ***H05B 3/42*** | (2006.01) |
| *A24F 40/10* | (2020.01) |
| *A24F 40/50* | (2020.01) |
| *H01C 7/04* | (2006.01) |

(52) U.S. Cl.

CPC ................ *H05B 3/42* (2013.01); *A24F 40/10* (2020.01); *A24F 40/50* (2020.01); *H01C 7/048* (2013.01); *H05B 2203/013* (2013.01); *H05B 2203/021* (2013.01); *H05B 2203/022* (2013.01)

(56) References Cited

U.S. PATENT DOCUMENTS

| | | | |
|---|---|---|---|
| 2,104,266 | A | 1/1938 | McCormick |
| 3,200,819 | A | 8/1965 | Gilbert |
| 4,284,089 | A | 8/1981 | Ray |
| 4,303,083 | A | 12/1981 | Burruss, Jr. |
| 4,735,217 | A | 4/1988 | Gerth et al. |
| 4,848,374 | A | 7/1989 | Chard et al. |
| 4,907,606 | A | 3/1990 | Lilja et al. |
| 4,922,901 | A | 5/1990 | Brooks et al. |
| 4,945,931 | A | 8/1990 | Gori |
| 4,947,874 | A | 8/1990 | Brooks et al. |
| 4,947,875 | A | 8/1990 | Brooks et al. |
| 4,986,286 | A | 1/1991 | Roberts et al. |
| 5,019,122 | A | 5/1991 | Clearman et al. |
| 5,042,510 | A | 8/1991 | Curtiss et al. |
| 5,060,671 | A | 10/1991 | Counts et al. |
| 5,093,894 | A | 3/1992 | Deevi et al. |
| 5,144,962 | A | 9/1992 | Counts et al. |
| 5,154,192 | A | 10/1992 | Sprinkel et al. |
| 5,249,586 | A | 10/1993 | Morgan et al. |
| 5,261,424 | A | 11/1993 | Sprinkel, Jr. |
| 5,322,075 | A | 6/1994 | Deevi et al. |
| 5,353,813 | A | 10/1994 | Deevi et al. |
| 5,369,723 | A | 11/1994 | Counts et al. |
| 5,372,148 | A | 12/1994 | McCafferty et al. |
| 5,388,574 | A | 2/1995 | Ingebrethsen et al. |
| 5,408,574 | A | 4/1995 | Deevi et al. |
| 5,468,936 | A | 11/1995 | Deevi et al. |
| 5,498,850 | A | 3/1996 | Das |
| 5,515,842 | A | 5/1996 | Ramseyer et al. |
| 5,530,225 | A | 6/1996 | Hajaligol |
| 5,564,442 | A | 10/1996 | MacDonald et al. |
| 5,649,554 | A | 7/1997 | Sprinkel et al. |
| 5,666,977 | A | 9/1997 | Higgins et al. |
| 5,687,746 | A | 11/1997 | Rose et al. |
| 5,726,421 | A | 3/1998 | Fleischhauer et al. |
| 5,727,571 | A | 3/1998 | Meiring et al. |
| 5,743,251 | A | 4/1998 | Howell et al. |
| 5,799,663 | A | 9/1998 | Gross et al. |
| 5,819,756 | A | 10/1998 | Mielordt |
| 5,865,185 | A | 2/1999 | Collins et al. |
| 5,865,186 | A | 2/1999 | Volsey, II |
| 5,878,752 | A | 3/1999 | Adams et al. |
| 5,894,841 | A | 4/1999 | Voges |
| 5,934,289 | A | 8/1999 | Watkins et al. |
| 5,954,979 | A | 9/1999 | Counts et al. |
| 5,967,148 | A | 10/1999 | Harris et al. |
| 6,040,560 | A | 3/2000 | Fleischhauer et al. |
| 6,053,176 | A | 4/2000 | Adams et al. |
| 6,089,857 | A | 7/2000 | Matsuura et al. |
| 6,095,153 | A | 8/2000 | Kessler et al. |
| 6,125,853 | A | 10/2000 | Susa et al. |
| 6,143,432 | A | 11/2000 | de Rochemont et al. |
| 6,155,268 | A | 12/2000 | Takeuchi |
| 6,164,287 | A | 12/2000 | White |
| 6,196,218 | B1 | 3/2001 | Voges |
| 6,196,219 | B1 | 3/2001 | Hess et al. |
| 6,598,607 | B2 | 7/2003 | Adiga et al. |
| 6,601,776 | B1 | 8/2003 | Oljaca et al. |
| 6,615,840 | B1 | 9/2003 | Fournier et al. |
| 6,688,313 | B2 | 2/2004 | Wrenn et al. |
| 6,772,756 | B2 | 8/2004 | Shayan |
| 6,803,545 | B2 | 10/2004 | Blake et al. |
| 6,854,461 | B2 | 2/2005 | Nichols |
| 6,854,470 | B1 | 2/2005 | Pu |
| 7,040,314 | B2 | 5/2006 | Nguyen et al. |
| 7,117,867 | B2 | 10/2006 | Cox et al. |
| 7,293,565 | B2 | 11/2007 | Griffin et al. |
| 7,513,253 | B2 | 4/2009 | Kobayashi et al. |
| 7,726,320 | B2 | 6/2010 | Robinson et al. |
| 7,775,459 | B2 | 8/2010 | Martens, III et al. |
| 7,832,410 | B2 | 11/2010 | Hon |
| 7,845,359 | B2 | 12/2010 | Montaser |
| 7,896,006 | B2 | 3/2011 | Hamano et al. |
| 8,127,772 | B2 | 3/2012 | Montaser |
| 8,205,622 | B2 | 6/2012 | Pan |
| 8,314,591 | B2 | 11/2012 | Terry et al. |
| 8,365,742 | B2 | 2/2013 | Hon |
| 8,402,976 | B2 | 3/2013 | Fernando et al. |
| 8,499,766 | B1 | 8/2013 | Newton |
| 8,528,569 | B1 | 9/2013 | Newton |
| 8,539,959 | B1 | 9/2013 | Scatterday |
| 8,550,069 | B2 | 10/2013 | Alelov |
| 8,910,639 | B2 | 12/2014 | Chang et al. |
| 8,910,640 | B2 | 12/2014 | Sears et al. |
| 2002/0146242 | A1 | 10/2002 | Vieira |
| 2003/0226837 | A1 | 12/2003 | Blake et al. |
| 2004/0118401 | A1 | 6/2004 | Smith et al. |
| 2004/0129280 | A1 | 7/2004 | Woodson et al. |
| 2004/0200488 | A1 | 10/2004 | Felter et al. |
| 2004/0226568 | A1 | 11/2004 | Takeuchi et al. |
| 2005/0016550 | A1 | 1/2005 | Katase |
| 2005/0040371 | A1 | 2/2005 | Watanabe et al. |
| 2006/0016453 | A1 | 1/2006 | Kim |
| 2006/0196518 | A1 | 9/2006 | Hon |
| 2007/0074734 | A1 | 4/2007 | Braunshteyn et al. |
| 2007/0102013 | A1 | 5/2007 | Adams et al. |
| 2007/0215167 | A1 | 9/2007 | Crooks et al. |
| 2008/0085103 | A1 | 4/2008 | Beland et al. |
| 2008/0092912 | A1 | 4/2008 | Robinson et al. |
| 2008/0257367 | A1 | 10/2008 | Paterno et al. |
| 2008/0276947 | A1 | 11/2008 | Martzel |
| 2008/0302374 | A1 | 12/2008 | Wengert et al. |
| 2009/0095311 | A1 | 4/2009 | Hon |
| 2009/0095312 | A1 | 4/2009 | Herbrich et al. |
| 2009/0126745 | A1 | 5/2009 | Hon |
| 2009/0188490 | A1 | 7/2009 | Hon |
| 2009/0230117 | A1 | 9/2009 | Fernando et al. |
| 2009/0272379 | A1 | 11/2009 | Thorens et al. |
| 2009/0283103 | A1 | 11/2009 | Nielsen et al. |
| 2009/0320863 | A1 | 12/2009 | Fernando et al. |
| 2010/0028766 | A1 | 2/2010 | Peckerar et al. |
| 2010/0031968 | A1 | 2/2010 | Sheikh et al. |
| 2010/0043809 | A1 | 2/2010 | Magnon |
| 2010/0083959 | A1 | 4/2010 | Siller |
| 2010/0163063 | A1 | 7/2010 | Fernando et al. |
| 2010/0200006 | A1 | 8/2010 | Robinson et al. |
| 2010/0229881 | A1 | 9/2010 | Hearn |
| 2010/0242974 | A1 | 9/2010 | Pan |
| 2010/0307518 | A1 | 12/2010 | Wang |
| 2010/0313901 | A1 | 12/2010 | Fernando et al. |
| 2011/0005535 | A1 | 1/2011 | Xiu |
| 2011/0011396 | A1 | 1/2011 | Fang |
| 2011/0036363 | A1 | 2/2011 | Urtsev et al. |
| 2011/0036365 | A1 | 2/2011 | Chong et al. |
| 2011/0094523 | A1 | 4/2011 | Thorens et al. |
| 2011/0126848 | A1 | 6/2011 | Zuber et al. |
| 2011/0155153 | A1 | 6/2011 | Thorens et al. |
| 2011/0155718 | A1 | 6/2011 | Greim et al. |
| 2011/0168194 | A1 | 7/2011 | Hon |
| 2011/0265806 | A1 | 11/2011 | Alarcon et al. |
| 2011/0290248 | A1 | 12/2011 | Schennum |
| 2011/0309157 | A1 | 12/2011 | Yang et al. |
| 2012/0042885 | A1 | 2/2012 | Stone et al. |

(56) References Cited

U.S. PATENT DOCUMENTS

| | | | |
|---|---|---|---|
| 2012/0060853 | A1 | 3/2012 | Robinson et al. |
| 2012/0111347 | A1 | 5/2012 | Hon |
| 2012/0132643 | A1 | 5/2012 | Choi et al. |
| 2012/0227752 | A1 | 9/2012 | Alelov |
| 2012/0231464 | A1 | 9/2012 | Yu et al. |
| 2012/0260927 | A1 | 10/2012 | Liu |
| 2012/0279512 | A1 | 11/2012 | Hon |
| 2012/0318882 | A1 | 12/2012 | Abehasera |
| 2013/0008457 | A1 | 1/2013 | Zheng et al. |
| 2013/0037041 | A1 | 2/2013 | Worm et al. |
| 2013/0056013 | A1 | 3/2013 | Terry et al. |
| 2013/0081625 | A1 | 4/2013 | Rustad et al. |
| 2013/0081642 | A1 | 4/2013 | Safari |
| 2013/0180533 | A1 | 7/2013 | Kim et al. |
| 2013/0192619 | A1 | 8/2013 | Tucker et al. |
| 2013/0192620 | A1 | 8/2013 | Tucker et al. |
| 2013/0192623 | A1 | 8/2013 | Tucker et al. |
| 2013/0213417 | A1 | 8/2013 | Chong et al. |
| 2013/0255702 | A1 | 10/2013 | Griffith, Jr. et al. |
| 2013/0298905 | A1 | 11/2013 | Levin et al. |
| 2013/0306064 | A1 | 11/2013 | Thorens et al. |
| 2013/0306084 | A1 | 11/2013 | Flick |
| 2013/0319439 | A1 | 12/2013 | Gorelick et al. |
| 2013/0340750 | A1 | 12/2013 | Thorens et al. |
| 2013/0340775 | A1 | 12/2013 | Juster et al. |
| 2014/0000638 | A1 | 1/2014 | Sebastian et al. |
| 2014/0060554 | A1 | 3/2014 | Collett et al. |
| 2014/0060555 | A1 | 3/2014 | Chang et al. |
| 2014/0096781 | A1 | 4/2014 | Sears et al. |
| 2014/0096782 | A1 | 4/2014 | Ampolini et al. |
| 2014/0109921 | A1 | 4/2014 | Chen |
| 2014/0157583 | A1 | 6/2014 | Ward et al. |
| 2014/0209105 | A1 | 7/2014 | Sears et al. |
| 2014/0253144 | A1 | 9/2014 | Novak et al. |
| 2014/0261408 | A1 | 9/2014 | DePiano et al. |
| 2014/0261486 | A1 | 9/2014 | Potter et al. |
| 2014/0261487 | A1 | 9/2014 | Chapman et al. |
| 2014/0261495 | A1 | 9/2014 | Novak et al. |
| 2014/0270727 | A1 | 9/2014 | Ampolini et al. |
| 2014/0270729 | A1 | 9/2014 | DePiano et al. |
| 2014/0270730 | A1 | 9/2014 | DePiano et al. |
| 2014/0345631 | A1 | 11/2014 | Bowen et al. |
| 2015/0020823 | A1 | 1/2015 | Lipowicz et al. |
| 2015/0020830 | A1 | 1/2015 | Koller |
| 2015/0053217 | A1 | 2/2015 | Steingraber et al. |
| 2015/0059780 | A1 | 3/2015 | Davis et al. |
| 2015/0181650 | A1 | 6/2015 | Kim et al. |
| 2015/0216232 | A1 | 8/2015 | Bless et al. |
| 2015/0216233 | A1 | 8/2015 | Sears et al. |
| 2015/0245658 | A1 | 9/2015 | Worm et al. |
| 2015/0257445 | A1 | 9/2015 | Henry, Jr. et al. |
| 2016/0007651 | A1 | 1/2016 | Ampolini et al. |
| 2016/0007652 | A1 | 1/2016 | Taluskie et al. |
| 2016/0158782 | A1 | 6/2016 | Henry, Jr. et al. |
| 2016/0262454 | A1 | 9/2016 | Sears et al. |
| 2017/0065000 | A1 | 3/2017 | Sears |
| 2017/0251724 | A1* | 9/2017 | Lamb ...................... A24F 40/60 |
| 2017/0303586 | A1 | 10/2017 | Sur |
| 2018/0221605 | A1* | 8/2018 | Marks ..................... A24F 40/46 |
| 2018/0288830 | A1 | 10/2018 | Sajic |
| 2019/0082735 | A1 | 3/2019 | Phillips et al. |
| 2020/0120760 | A1 | 4/2020 | Hu et al. |
| 2020/0281249 | A1 | 9/2020 | Sebastian et al. |
| 2021/0185770 | A1* | 6/2021 | Sur ........................ H05B 3/145 |

FOREIGN PATENT DOCUMENTS

| | | |
|---|---|---|
| CN | 1541577 | 11/2004 |
| CN | 2719043 | 8/2005 |
| CN | 200997909 | 1/2008 |
| CN | 101116542 | 2/2008 |
| CN | 101176805 | 5/2008 |
| CN | 201379072 | 1/2010 |
| DE | 10 2006 004 484 | 8/2007 |
| DE | 102006041042 | 3/2008 |
| DE | 20 2009 010 400 | 11/2009 |
| EP | 0 295 122 | 12/1988 |
| EP | 0 430 566 | 6/1991 |
| EP | 0 845 220 | 6/1998 |
| EP | 1 618 803 | 1/2006 |
| EP | 2 316 286 | 5/2011 |
| GB | 2469850 | 11/2010 |
| WO | WO 1997/48293 | 12/1997 |
| WO | WO 2003/034847 | 5/2003 |
| WO | WO 2004/043175 | 5/2004 |
| WO | WO 2004/080216 | 9/2004 |
| WO | WO 2005/099494 | 10/2005 |
| WO | WO 2007/078273 | 7/2007 |
| WO | WO 2007/131449 | 11/2007 |
| WO | WO 2009/105919 | 9/2009 |
| WO | WO 2009/155734 | 12/2009 |
| WO | WO 2010/003480 | 1/2010 |
| WO | WO 2010/045670 | 4/2010 |
| WO | WO 2010/073122 | 7/2010 |
| WO | WO 2010/118644 | 10/2010 |
| WO | WO 2010/140937 | 12/2010 |
| WO | WO 2011/010334 | 1/2011 |
| WO | WO 2012/072762 | 6/2012 |
| WO | WO 2012/100523 | 8/2012 |
| WO | WO 2013/089551 | 6/2013 |
| WO | WO 2016/069876 | 5/2016 |
| WO | WO 2016/156214 | 10/2016 |
| WO | WO 2017/167647 | 10/2017 |

* cited by examiner

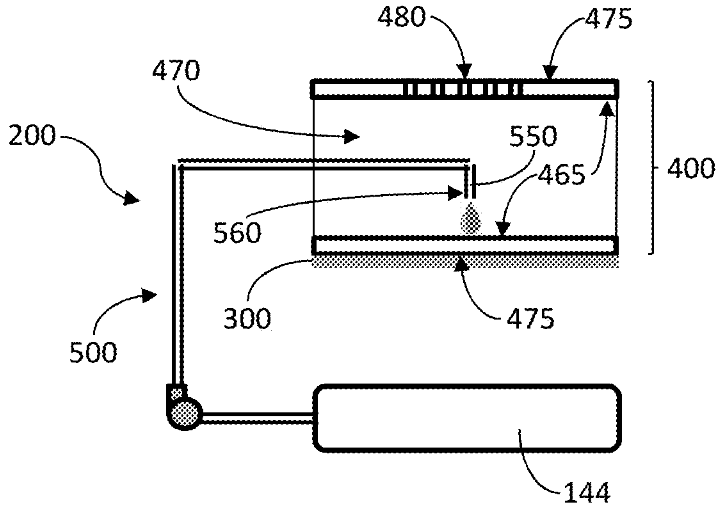
FIG. 4
FIG. 5
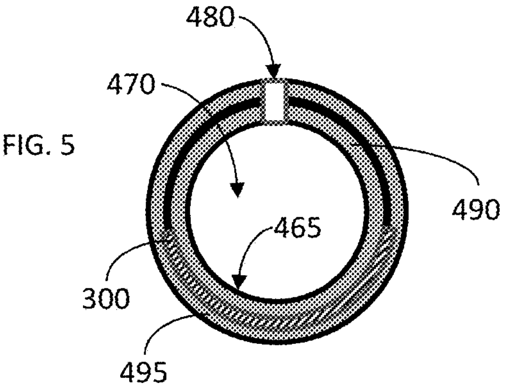

AEROSOL DELIVERY DEVICE, AND ASSOCIATED APPARATUS AND METHOD OF FORMATION THEREOF

CROSS REFERENCE TO RELATED APPLICATION

This application is a continuation of U.S. application Ser. No. 16/038,991, filed Jul. 18, 2018; which is a continuation application of U.S. application Ser. No. 15/133,916, filed Apr. 20, 2016, the contents of which are herein incorporated by reference in their entirety.

FIELD OF THE DISCLOSURE

The present disclosure relates to aerosol delivery devices such as smoking articles, and more particularly to aerosol delivery devices that may utilize electrically generated heat for the production of aerosol (e.g., smoking articles commonly referred to as electronic cigarettes). The smoking articles may be configured to heat an aerosol precursor, which may incorporate materials that may be made or derived from tobacco or otherwise incorporate tobacco, the precursor being capable of forming an inhalable substance for human consumption.

BACKGROUND

Many smoking devices have been proposed through the years as improvements upon, or alternatives to, smoking products that require combusting tobacco for use. Many of those devices purportedly have been designed to provide the sensations associated with cigarette, cigar, or pipe smoking, but without delivering considerable quantities of incomplete combustion and pyrolysis products that result from the burning of tobacco. To this end, there have been proposed numerous smoking products, flavor generators, and medicinal inhalers that utilize electrical energy to vaporize or heat a volatile material, or attempt to provide the sensations of cigarette, cigar, or pipe smoking without burning tobacco to a significant degree. See, for example, the various alternative smoking articles, aerosol delivery devices, and heat generating sources set forth in the background art described in U.S. Pat. No. 7,726,320 to Robinson et al., U.S. Pat. Pub. No. 2013/0255702 to Griffith Jr. et al., and U.S. Pat. Pub. No. 2014/0096781 to Sears et al., which are incorporated herein by reference. See also, for example, the various types of smoking articles, aerosol delivery devices, and electrically powered heat generating sources referenced by brand name and commercial source in U.S. patent application Ser. No. 14/170,838 to Bless et al., filed Feb. 3, 2014, which is incorporated herein by reference in its entirety.

Improvements to such types of smoking articles, aerosol delivery devices, and electrically powered heat generating sources, may be desirable. For example, it may be desirable to avoid direct engagement or physical contact between the aerosol precursor and the heating element implemented to volatilize the aerosol precursor to form an aerosol. As such, charring or other heat-related concerns associated with the device/apparatus for dispensing the aerosol precursor may be reduced or eliminated. In addition, issues related to interaction between the aerosol precursor and the carbon element such as, for example, short circuits, erosion, build-up, charring, or otherwise, may also be reduced or eliminated. In addition, it may be desirable for such types of smoking articles, aerosol delivery devices, and electrically powered heat generating sources to exhibit a faster heating/heat response time, with improved (lesser) power consumption for increased power source life.

SUMMARY OF THE DISCLOSURE

The present disclosure relates to aerosol delivery devices, methods of forming such devices, and elements of such devices. More particularly, the above and other needs are met by aspects of the present disclosure which, in one aspect, provides an aerosol delivery device, comprising a control body and a cartridge serially engaged therewith, the cartridge including an aerosol precursor source housing an aerosol precursor, and defining a mouth opening configured to direct an aerosol therethrough to a user. A heater device is operably engaged with the cartridge, wherein the heater device comprises an electrically-conductive carbon element disposed adjacent to a heat-conductive substrate. The heater device is configured to receive the aerosol precursor from the aerosol precursor source onto the heat-conductive substrate, such that the aerosol precursor on the heat-conductive substrate forms the aerosol in response to heat from the electrically-conductive carbon element conducted through the heat-conductive substrate.

Another aspect of the present disclosure provides an aerosol formation apparatus, comprising an aerosol precursor source housing an aerosol precursor, and a heater device including an electrically-conductive carbon element disposed adjacent to a heat-conductive substrate. The heater device is configured to receive the aerosol precursor from the aerosol precursor source onto the heat-conductive substrate, such that the aerosol precursor on the heat-conductive substrate forms the aerosol in response to heat from the electrically-conductive carbon element conducted through the heat-conductive substrate.

A further aspect of the present disclosure provides a method of forming an aerosol delivery device. Such a method comprises operably engaging an aerosol precursor source, housing an aerosol precursor, with a heater device including an electrically-conductive carbon element disposed adjacent to a heat-conductive substrate, wherein the heater device is configured to receive the aerosol precursor from the aerosol precursor source onto the heat-conductive substrate, such that the aerosol precursor on the heat-conductive substrate forms the aerosol in response to heat from the electrically-conductive carbon element conducted through the heat-conductive substrate.

Further features and advantages of the present disclosure are set forth in more detail in the following description.

BRIEF DESCRIPTION OF THE FIGURES

Figure 1:
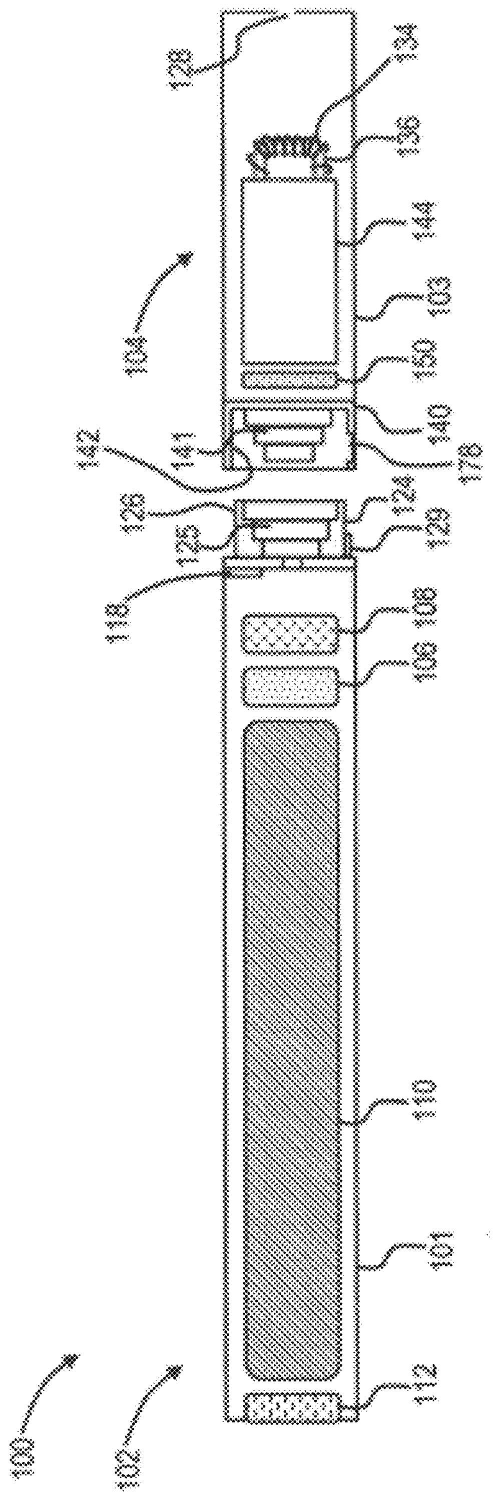
Figure 2:
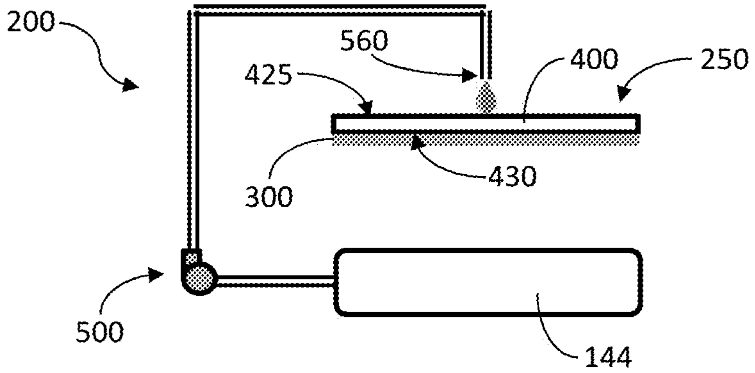
Figure 3:
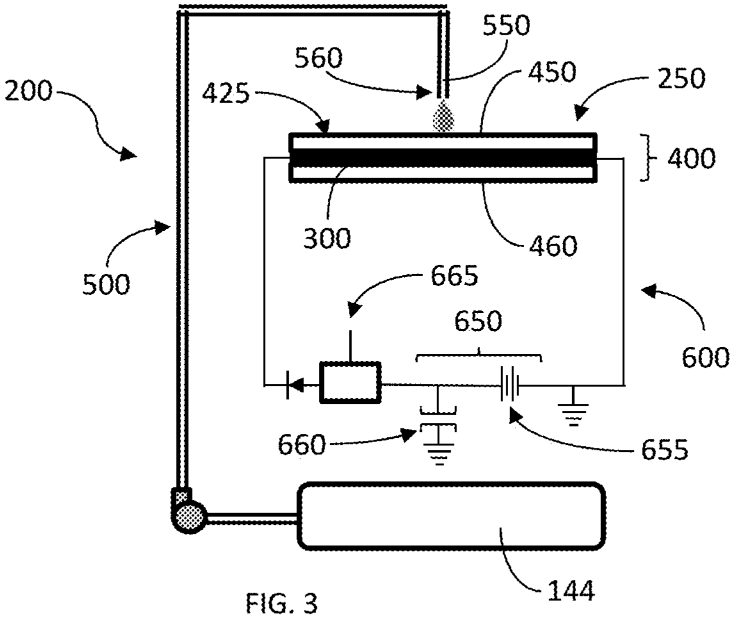
Figure 6:
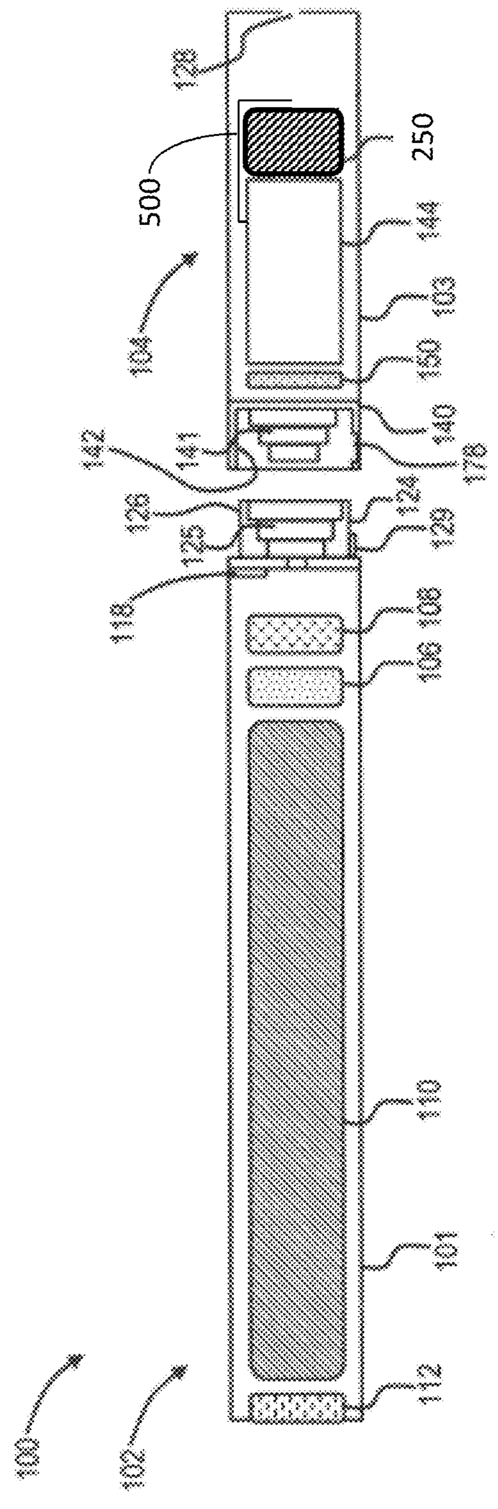
Figure 7:
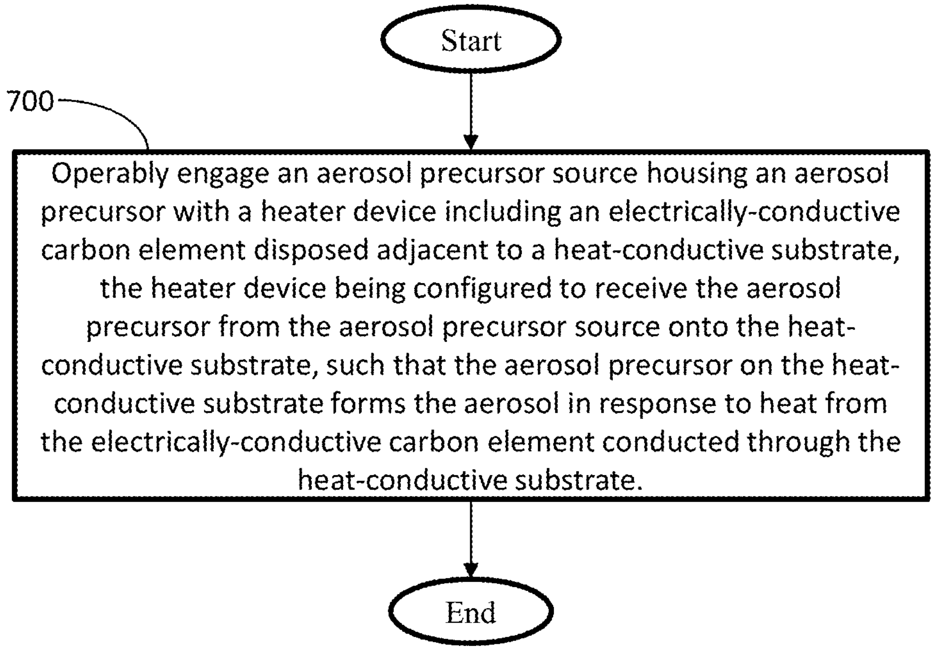

Having thus described the disclosure in the foregoing general terms, reference will now be made to the accompanying drawings, which are not necessarily drawn to scale, and wherein:

FIG. 1 is a partially cut-away view of an aerosol delivery device comprising a cartridge and a control body including a variety of elements that may be utilized in an aerosol delivery device according to various embodiments of the present disclosure;

FIGS. 2-4 schematically illustrate aspects of an aerosol formation apparatus, according to various embodiments of the present disclosure;

FIG. 5 schematically illustrates an aerosol formation apparatus having a hollow cylinder configuration, according to one embodiment of the present disclosure;

FIG. 6 schematically illustrates an aerosol formation apparatus, according to embodiments of the present disclosure, engaged with an aerosol delivery device; and FIG. 7 schematically illustrates a method of forming an aerosol delivery device, according to one embodiment of the present disclosure.

DETAILED DESCRIPTION

The present disclosure will now be described more fully hereinafter with reference to exemplary embodiments thereof. These exemplary embodiments are described so that this disclosure will be thorough and complete, and will fully convey the scope of the disclosure to those skilled in the art. Indeed, the disclosure may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

As described hereinafter, embodiments of the present disclosure relate to aerosol delivery systems. Aerosol delivery systems according to the present disclosure use electrical energy to heat a material (preferably without combusting the material to any significant degree and/or without significant chemical alteration of the material) to form an inhalable substance; and components of such systems have the form of articles that most preferably are sufficiently compact to be considered hand-held devices. That is, use of components of preferred aerosol delivery systems does not result in the production of smoke—i.e., from by-products of combustion or pyrolysis of tobacco, but rather, use of those preferred systems results in the production of vapors resulting from volatilization or vaporization of certain components incorporated therein. In preferred embodiments, components of aerosol delivery systems may be characterized as electronic cigarettes, and those electronic cigarettes most preferably incorporate tobacco and/or components derived from tobacco, and hence deliver tobacco derived components in aerosol form.

Aerosol generating pieces of certain preferred aerosol delivery systems may provide many of the sensations (e.g., inhalation and exhalation rituals, types of tastes or flavors, organoleptic effects, physical feel, use rituals, visual cues such as those provided by visible aerosol, and the like) of smoking a cigarette, cigar, or pipe that is employed by lighting and burning tobacco (and hence inhaling tobacco smoke), without any substantial degree of combustion of any component thereof. For example, the user of an aerosol generating piece of the present disclosure can hold and use that piece much like a smoker employs a traditional type of smoking article, draw on one end of that piece for inhalation of aerosol produced by that piece, take or draw puffs at selected intervals of time, and the like.

Aerosol delivery devices of the present disclosure also can be characterized as being vapor-producing articles or medicament delivery articles. Thus, such articles or devices can be adapted so as to provide one or more substances (e.g., flavors and/or pharmaceutical active ingredients) in an inhalable form or state. For example, inhalable substances can be substantially in the form of a vapor (i.e., a substance that is in the gas phase at a temperature lower than its critical point). Alternatively, inhalable substances can be in the form of an aerosol (i.e., a suspension of fine solid particles or liquid droplets in a gas). For purposes of simplicity, the term "aerosol" as used herein is meant to include vapors, gases, and aerosols of a form or type suitable for human inhalation, whether or not visible, and whether or not of a form that might be considered to be smoke-like.

Aerosol delivery devices of the present disclosure generally include a number of components provided within an outer body or shell, which may be referred to as a housing. The overall design of the outer body or shell can vary, and the format or configuration of the outer body that can define the overall size and shape of the aerosol delivery device can vary. Typically, an elongated body resembling the shape of a cigarette or cigar can be a formed from a single, unitary housing, or the elongated housing can be formed of two or more separable bodies. For example, an aerosol delivery device can comprise an elongated shell or body that can be substantially tubular in shape and, as such, resemble the shape of a conventional cigarette or cigar. In one embodiment, all of the components of the aerosol delivery device are contained within one housing. Alternatively, an aerosol delivery device can comprise two or more housings that are joined and are separable. For example, an aerosol delivery device can possess at one end a control body comprising a housing containing one or more components (e.g., a battery and various electronics for controlling the operation of that article), and at the other end and removably attached thereto an outer body or shell containing aerosol forming components (e.g., one or more aerosol precursor components, such as flavors and aerosol formers, one or more heaters, and/or one or more wicks).

Aerosol delivery devices of the present disclosure can be formed of an outer housing or shell that is not substantially tubular in shape but may be formed to substantially greater dimensions. The housing or shell can be configured to include a mouthpiece and/or may be configured to receive a separate shell (e.g., a cartridge) that can include consumable elements, such as a liquid aerosol former, and can include a vaporizer or atomizer.

Aerosol delivery devices of the present disclosure most preferably comprise some combination of a power source (i.e., an electrical power source), at least one control component (e.g., means for actuating, controlling, regulating and ceasing power for heat generation, such as by controlling electrical current flow the power source to other components of the article—e.g., a microcontroller or microprocessor), a heater or heat generation member (e.g., an electrical resistance heating element or other component, which alone or in combination with one or more further elements may be commonly referred to as an "atomizer"), an aerosol precursor composition (e.g., commonly a liquid capable of yielding an aerosol upon application of sufficient heat, such as ingredients commonly referred to as "smoke juice," "e-liquid" and "e-juice"), and a mouthpiece or mouth region for allowing draw upon the aerosol delivery device for aerosol inhalation (e.g., a defined airflow path through the article such that aerosol generated can be withdrawn therefrom upon draw).

More specific formats, configurations and arrangements of components within the aerosol delivery systems of the present disclosure will be evident in light of the further disclosure provided hereinafter. Additionally, the selection and arrangement of various aerosol delivery system components can be appreciated upon consideration of the commercially available electronic aerosol delivery devices, such as those representative products referenced in background art section of the present disclosure.

One example embodiment of an aerosol delivery device 100 illustrating components that may be utilized in an aerosol delivery device according to the present disclosure is provided in FIG. 1. As seen in the cut-away view illustrated therein, the aerosol delivery device 100 can comprise a control body 102 and a cartridge 104 that can be permanently or detachably aligned in a functioning relationship. Engagement of the control body 102 and the cartridge 104 can be press fit (as illustrated), threaded, interference fit, magnetic, or the like. In particular, connection components, such as further described herein may be used. For example, the control body may include a coupler that is adapted to engage a connector on the cartridge.

In specific embodiments, one or both of the control body 102 and the cartridge 104 may be referred to as being disposable or as being reusable. For example, the control body may have a power source comprising a replaceable battery or a rechargeable battery (though any other suitable power source, such as a capacitor, a supercapacitor, an ultracapacitor, or a thin-film solid-state battery, may be implemented as necessary or desired) and thus may be combined with any type of recharging technology, including connection to a typical electrical outlet, connection to a car charger (i.e., cigarette lighter receptacle), and connection to a computer, such as through a universal serial bus (USB) cable. For example, an adaptor including a USB connector at one end and a control body connector at an opposing end is disclosed in U.S. Pat. Pub. No. 2014/0261495 to Novak et al., which is incorporated herein by reference in its entirety. Further, in some embodiments, the cartridge may comprise a single-use cartridge, as disclosed in U.S. Pat. No. 8,910,639 to Chang et al., which is incorporated herein by reference in its entirety. As illustrated in FIG. 1, a control body 102 can be formed of a control body shell 101 that can include a control component 106 (e.g., a printed circuit board (PCB), an integrated circuit, a memory component, a microcontroller, or the like), a flow sensor 108, a battery 110, and an LED 112, and such components can be variably aligned. Further indicators (e.g., a haptic feedback component, an audio feedback component, or the like) can be included in addition to or as an alternative to the LED. Additional representative types of components that yield visual cues or indicators, such as light emitting diode (LED) components, and the configurations and uses thereof, are described in U.S. Pat. No. 5,154,192 to Sprinkel et al.; U.S. Pat. No. 8,499,766 to Newton and U.S. Pat. No. 8,539,959 to Scatterday; and U.S. patent application Ser. No. 14/173,266, filed Feb. 5, 2014, to Sears et al.; which are incorporated herein by reference.

A cartridge 104 can be formed of a cartridge shell 103 enclosing the reservoir 144 that is in fluid communication with a liquid transport element 136 adapted to wick or otherwise transport an aerosol precursor composition stored in the reservoir housing to a heater 134. A liquid transport element can be formed of one or more materials configured for transport of a liquid, such as by capillary action. A liquid transport element can be formed of, for example, fibrous materials (e.g., organic cotton, cellulose acetate, regenerated cellulose fabrics, glass fibers), porous ceramics, porous carbon, graphite, porous glass, sintered glass beads, sintered ceramic beads, capillary tubes, or the like. The liquid transport element thus can be any material that contains an open pore network (i.e., a plurality of pores that are interconnected so that fluid may flow from one pore to another in a plurality of direction through the element). Various embodiments of materials configured to produce heat when electrical current is applied therethrough may be employed to form the resistive heating element 134. Example materials from which the wire coil may be formed include Kanthal (FeCrAl), Nichrome, Molybdenum disilicide ($MoSi_2$), molybdenum silicide (MoSi), Molybdenum disilicide doped with Aluminum ($Mo(Si,Al)_2$), titanium, platinum, silver, palladium, graphite and graphite-based materials (e.g., carbon-based foams and yarns) and ceramics (e.g., positive or negative temperature coefficient ceramics). In further embodiments, a heater may comprise a variety of materials configured to provide electromagnetic radiation, including laser diodes.

An opening 128 may be present in the cartridge shell 103 (e.g., at the mouthend) to allow for egress of formed aerosol from the cartridge 104. Such components are representative of the components that may be present in a cartridge and are not intended to limit the scope of cartridge components that are encompassed by the present disclosure.

The cartridge 104 also may include one or more electronic components 150, which may include an integrated circuit, a memory component, a sensor, or the like. The electronic component 150 may be adapted to communicate with the control component 106 and/or with an external device by wired or wireless means. The electronic component 150 may be positioned anywhere within the cartridge 104 or its base 140.

Although the control component 106 and the flow sensor 108 are illustrated separately, it is understood that the control component and the flow sensor may be combined as an electronic circuit board with the air flow sensor attached directly thereto. Further, the electronic circuit board may be positioned horizontally relative the illustration of FIG. 1 in that the electronic circuit board can be lengthwise parallel to the central axis of the control body. In some embodiments, the air flow sensor may comprise its own circuit board or other base element to which it can be attached. In some embodiments, a flexible circuit board may be utilized. A flexible circuit board may be configured into a variety of shapes, include substantially tubular shapes.

The control body 102 and the cartridge 104 may include components adapted to facilitate a fluid engagement therebetween. As illustrated in FIG. 1, the control body 102 can include a coupler 124 having a cavity 125 therein. The cartridge 104 can include a base 140 adapted to engage the coupler 124 and can include a projection 141 adapted to fit within the cavity 125. Such engagement can facilitate a stable connection between the control body 102 and the cartridge 104 as well as establish an electrical connection between the battery 110 and control component 106 in the control body and the heater 134 in the cartridge. Further, the control body shell 101 can include an air intake 118, which may be a notch in the shell where it connects to the coupler 124 that allows for passage of ambient air around the coupler and into the shell where it then passes through the cavity 125 of the coupler and into the cartridge through the projection 141.

A coupler and a base useful according to the present disclosure are described in U.S. Pat. Pub. No. 2014/0261495 to Novak et al., the disclosure of which is incorporated herein by reference in its entirety. For example, a coupler as seen in FIG. 1 may define an outer periphery 126 configured to mate with an inner periphery 142 of the base 140. In one embodiment the inner periphery of the base may define a radius that is substantially equal to, or slightly greater than, a radius of the outer periphery of the coupler. Further, the coupler 124 may define one or more protrusions 129 at the outer periphery 126 configured to engage one or more recesses 178 defined at the inner periphery of the base. However, various other embodiments of structures, shapes, and components may be employed to couple the base to the coupler. In some embodiments the connection between the base 140 of the cartridge 104 and the coupler 124 of the control body 102 may be substantially permanent, whereas in other embodiments the connection therebetween may be releasable such that, for example, the control body may be reused with one or more additional cartridges that may be disposable and/or refillable.

The aerosol delivery device 100 may be substantially rod-like or substantially tubular shaped or substantially cylindrically shaped in some embodiments. In other embodiments, further shapes and dimensions are encompassed—e.g., a rectangular or triangular cross-section, multifaceted shapes, or the like.

The reservoir 144 illustrated in FIG. 1 can be a container or can be a fibrous reservoir, as presently described. For example, the reservoir 144 can comprise one or more layers of nonwoven fibers substantially formed into the shape of a tube encircling the interior of the cartridge shell 103, in this embodiment. An aerosol precursor composition can be retained in the reservoir 144. Liquid components, for example, can be sorptively retained by the reservoir 144. The reservoir 144 can be in fluid connection with a liquid transport element 136. The liquid transport element 136 can transport the aerosol precursor composition stored in the reservoir 144 via capillary action to the heating element 134 that may be in the form of a metal wire coil in this embodiment. As such, the heating element 134 is in a heating arrangement with the liquid transport element 136.

In use, when a user draws on the article 100, airflow is detected by the sensor 108, the heating element 134 is activated, and the components for the aerosol precursor composition are vaporized by the heating element 134. Drawing upon the mouthend of the article 100 causes ambient air to enter the air intake 118 and pass through the cavity 125 in the coupler 124 and the central opening in the projection 141 of the base 140. In the cartridge 104, the drawn air combines with the formed vapor to form an aerosol. The aerosol is whisked, aspirated, or otherwise drawn away from the heating element 134 and out the mouth opening 128 in the mouthend of the article 100.

An input element may be included with the aerosol delivery device. The input may be included to allow a user to control functions of the device and/or for output of information to a user. Any component or combination of components may be utilized as an input for controlling the function of the device. For example, one or more pushbuttons may be used as described in U.S. patent application Ser. No. 14/193,961, filed Feb. 28, 2014, to Worm et al., which is incorporated herein by reference. Likewise, a touchscreen may be used as described in U.S. patent application Ser. No. 14/643,626, filed Mar. 10, 2015, to Sears et al., which is incorporated herein by reference. As a further example, components adapted for gesture recognition based on specified movements of the aerosol delivery device may be used as an input. See U.S. patent application Ser. No. 14/565,137, filed Dec. 9, 2014, to Henry et al., which is incorporated herein by reference. In some embodiments, an input may comprise a computer or computing device, such as a smartphone or tablet. In particular, the aerosol delivery device may be wired to the computer or other device, such as via use of a USB cord or similar protocol. The aerosol delivery device also may communicate with a computer or other device acting as an input via wireless communication. See, for example, the systems and methods for controlling a device via a read request as described in U.S. patent application Ser. No. 14/327,776, filed Jul. 10, 2014, to Ampolini et al., the disclosure of which is incorporated herein by reference. In such embodiments, an APP or other computer program may be used in connection with a computer or other computing device to input control instructions to the aerosol delivery device, such control instructions including, for example, the ability to form an aerosol of specific composition by choosing the nicotine content and/or content of further flavors to be included.

The various components of an aerosol delivery device according to the present disclosure can be chosen from components described in the art and commercially available. Examples of batteries that can be used according to the disclosure are described in U.S. Pat. Pub. No. 2010/0028766 to Peckerar et al., the disclosure of which is incorporated herein by reference in its entirety.

The aerosol delivery device can incorporate a sensor or detector for control of supply of electric power to the heat generation element when aerosol generation is desired (e.g., upon draw during use). As such, for example, there is provided a manner or method for turning off the power supply to the heat generation element when the aerosol delivery device is not be drawn upon during use, and for turning on the power supply to actuate or trigger the generation of heat by the heat generation element during draw. Additional representative types of sensing or detection mechanisms, structure and configuration thereof, components thereof, and general methods of operation thereof, are described in U.S. Pat. No. 5,261,424 to Sprinkel, Jr.; U.S. Pat. No. 5,372,148 to McCafferty et al.; and PCT WO 2010/003480 to Flick; which are incorporated herein by reference.

The aerosol delivery device most preferably incorporates a control mechanism for controlling the amount of electric power to the heat generation element during draw. Representative types of electronic components, structure and configuration thereof, features thereof, and general methods of operation thereof, are described in U.S. Pat. No. 4,735,217 to Gerth et al.; U.S. Pat. No. 4,947,874 to Brooks et al.; U.S. Pat. No. 5,372,148 to McCafferty et al.; U.S. Pat. No. 6,040,560 to Fleischhauer et al.; U.S. Pat. No. 7,040,314 to Nguyen et al. and U.S. Pat. No. 8,205,622 to Pan; U.S. Pat. Pub. Nos. 2009/0230117 to Fernando et al., 2014/0060554 to Collet et al., and 2014/0270727 to Ampolini et al.; and U.S. patent application Ser. No. 14/209,191, filed Mar. 13, 2014, to Henry et al.; which are incorporated herein by reference. Representative types of substrates, reservoirs or other components for supporting the aerosol precursor are described in U.S. Pat. No. 8,528,569 to Newton; U.S. Pat. Pub. Nos. 2014/0261487 to Chapman et al. and 2014/0059780 to Davis et al.; and U.S. patent application Ser. No. 14/170,838, filed Feb. 3, 2014, to Bless et al.; which are incorporated herein by reference. Additionally, various wicking materials, and the configuration and operation of those wicking materials within certain types of electronic cigarettes, are set forth in U.S. Pat. No. 8,910,640 to Sears et al.; which is incorporated herein by reference.

For aerosol delivery systems that are characterized as electronic cigarettes, the aerosol precursor composition most preferably incorporates tobacco or components derived from tobacco. In one regard, the tobacco may be provided as parts or pieces of tobacco, such as finely ground, milled or powdered tobacco lamina. In another regard, the tobacco may be provided in the form of an extract, such as a spray dried extract that incorporates many of the water soluble components of tobacco. Alternatively, tobacco extracts may have the form of relatively high nicotine content extracts, which extracts also incorporate minor amounts of other extracted components derived from tobacco. In another regard, components derived from tobacco may be provided in a relatively pure form, such as certain flavoring agents that are derived from tobacco. In one regard, a component that is derived from tobacco, and that may be employed in a highly purified or essentially pure form, is nicotine (e.g., pharmaceutical grade nicotine).

The aerosol precursor composition, also referred to as a vapor precursor composition, may comprise a variety of components including, by way of example, a polyhydric alcohol (e.g., glycerin, propylene glycol, or a mixture thereof), nicotine, tobacco, tobacco extract, and/or flavorants. Representative types of aerosol precursor components and formulations also are set forth and characterized in U.S. Pat. No. 7,217,320 to Robinson et al. and U.S. Pat. Pub. Nos. 2013/0008457 to Zheng et al.; 2013/0213417 to Chong et al.; 2014/0060554 to Collett et al.; 2015/0020823 to Lipowicz et al.; and 2015/0020830 to Koller, as well as WO 2014/182736 to Bowen et al, the disclosures of which are incorporated herein by reference. Other aerosol precursors that may be employed include the aerosol precursors that have been incorporated in the VUSE® product by R. J. Reynolds Vapor Company, the BLU™ product by Lorillard Technologies, the MISTIC MENTHOL product by Mistic Ecigs, and the VYPE product by CN Creative Ltd. Also desirable are the so-called "smoke juices" for electronic cigarettes that have been available from Johnson Creek Enterprises LLC.

The amount of aerosol precursor that is incorporated within the aerosol delivery system is such that the aerosol generating piece provides acceptable sensory and desirable performance characteristics. For example, it is highly preferred that sufficient amounts of aerosol forming material (e.g., glycerin and/or propylene glycol), be employed in order to provide for the generation of a visible mainstream aerosol that in many regards resembles the appearance of tobacco smoke. The amount of aerosol precursor within the aerosol generating system may be dependent upon factors such as the number of puffs desired per aerosol generating piece. Typically, the amount of aerosol precursor incorporated within the aerosol delivery system, and particularly within the aerosol generating piece, is less than about 2 g, generally less than about 1.5 g, often less than about 1 g and frequently less than about 0.5 g. Yet other features, controls or components that can be incorporated into aerosol delivery systems of the present disclosure are described in U.S. Pat. No. 5,967,148 to Harris et al.; U.S. Pat. No. 5,934,289 to Watkins et al.; U.S. Pat. No. 5,954,979 to Counts et al.; U.S. Pat. No. 6,040,560 to Fleischhauer et al.; U.S. Pat. No. 8,365,742 to Hon; U.S. Pat. No. 8,402,976 to Fernando et al.; U.S. Pat. Pub. Nos. 2010/0163063 to Fernando et al.; 2013/0192623 to Tucker et al.; 2013/0298905 to Leven et al.; 2013/0180553 to Kim et al., 2014/0000638 to Sebastian et al., 2014/0261495 to Novak et al., and 2014/0261408 to DePiano et al.; which are incorporated herein by reference.

The foregoing description of use of the article can be applied to the various embodiments described herein through minor modifications, which can be apparent to the person of skill in the art in light of the further disclosure provided herein. The above description of use, however, is not intended to limit the use of the article but is provided to comply with all necessary requirements of disclosure of the present disclosure. Any of the elements shown in the article illustrated in FIG. 1 or as otherwise described above may be included in an aerosol delivery device according to the present disclosure.

In view of the foregoing, one aspect of the present disclosure is directed to the aerosol precursor composition from the reservoir 144, and the direction thereof into engagement with the heating arrangement to form the aerosol. More particularly, one aspect of the present disclosure, as shown, for example, in FIG. 2, is directed to an aerosol formation apparatus 200, comprising an aerosol precursor source, such as the reservoir 144, housing an aerosol precursor, and a heater device 250 including an electrically-conductive carbon element 300 disposed adjacent to a heat-conductive substrate 400. In such an arrangement, the heater device 300 may be configured to receive the aerosol precursor from the aerosol precursor source 144 onto the heat-conductive substrate 400. In this manner, the aerosol precursor may be delivered into engagement with or onto the heat-conductive substrate 400 to form the aerosol in response to heat from the electrically-conductive carbon element 300 conducted through the heat-conductive substrate 400. In some aspects, a delivery device 500 may be operably engaged between the aerosol precursor source 144 and the heat-conductive substrate 400, and is configured to deliver the aerosol precursor from the aerosol precursor source 144 and onto the heat-conductive substrate 400. For example, the delivery device 500 may comprise, for example, a pump apparatus or a wick arrangement.

In one particular aspect, the aerosol precursor source 144 is configured to dispense the aerosol precursor on a surface 425 of the heat-conductive substrate 400. Accordingly, in such instances, the surface 425 of the heat-conductive substrate 400 is opposite to the surface 430 of the heat-conductive substrate 400 with which the carbon element 300 is engaged. That is, the heat-conductive substrate 400 may have the electrically-conductive carbon element 300 mounted on, applied to, or otherwise engaged with one surface 430 of the heat conductive substrate 400, wherein the opposite surface 425 of the heat-conductive substrate 400 is the surface on which the aerosol precursor is dispensed by the delivery device 500. The heat from the electrically-conductive carbon element 300 is conducted through the heat-conductive substrate 400, wherein contact or other engagement between the aerosol precursor and the heated surface 425 causes the aerosol precursor to form an aerosol in response to the heat.

In some embodiments, the electrically-conductive carbon element 300 may comprise an electrically-conductive graphene element, more particularly, an electrically conductive square graphene sheet or graphene foil, or a plurality of electrically conductive square graphene sheets or graphene foils stacked together. Such graphene sheets or graphene foils may be commercially available, for example, from Applied Nanotech, Inc. of Austin, TX Various types and forms of graphene and graphene materials that may be implemented in conjunction with various aspects of the present disclosure are disclosed, for example, in U.S. patent application Ser. No. 14/840,178 to Beeson et al., which is incorporated by reference herein in its entirety. In particular instances, it may be preferable for the carbon element to be configured or selected to have a resistance of about 3 Ohms/square unit. The heater device 250 may further comprise an electrical circuit 600 (see, e.g., FIG. 3) engaged with the carbon element 300, wherein the carbon element 300 may be configured or otherwise function as a resistive element that generates heat in response to application of an electrical current from the electrical circuit 600. As such, the heat-conductive substrate 400 preferably comprises a thermally-conductive or heat conductive, but not electrically conductive, material such as, for example, a heat-conductive glass or suitable composite material, which is otherwise not electrically conductive. For example, the heat conductive substrate 400 may comprise, a thermally-conductive dielectric material, such as Thercobond™, which is commercially available from Applied Nanotech, Inc. The electrically-conductive carbon element 300 may be embedded within or otherwise coated with the thermally-conductive dielectric material, acting as the heat-conductive substrate 400. Accordingly, in some instances, the heater device 250 may comprise the electrically-conductive carbon element 300, and a single heat-conductive substrate 400 (i.e., a single piece of heat-conductive glass or suitable composite material) with which the electrically-conductive carbon element 300 is engaged. In one example, the heat-conductive glass or suitable composite material forming the heat-conductive substrate 400 may have a thickness of, for example, about 2 mm or less.

As shown in FIG. 3, the power in the electrical circuit 600 may be provided, for example, by an appropriate power source 650, such as a battery 655 and/or a capacitor 660 (e.g., a supercapacitor). The power from the power source 650 may be directed through a voltage regulator or a DC-DC converter 665 to provide a constant voltage/constant current for the electrical circuit 600. Appropriate conductive electrodes formed of, for example, aluminum, silver, or other appropriate conductive material, may be applied to opposing ends or edges of the square graphene sheet(s) (i.e., the electrically-conductive carbon element 300) in order for the resistive load (the square graphene sheet(s)) to be connected to the electrical circuit 600. The electrical circuit 600 may be actuated, for example, an appropriate switch or sensor (i.e., a push button switch, a puff sensor, or a proximity sensor (e.g., a capacitive-based proximity sensor)—not shown). In one example, where the power source 650 provides a 3V power drop, resulting in 1 A of current through the resistive load (3 Ohms), the electrically-conductive carbon element 300 may reach temperatures, for example, up to 280° C.

In another example aspect, as shown in FIG. 3, the carbon element 300 may be disposed between two layers 450, 460 of the heat-conductive substrate 400. More particularly, in one aspect, each layer 450, 460 of the heat-conductive substrate 400 may comprise a planar sheet or an arcuate portion of a heat-conductive glass, a thermally-conductive dielectric material (e.g., Thercobond™) or a suitable composite material. That is, the two interacting portions or layers 450, 460 may be two planar sheets of heat-conductive glass or suitable composite material having the electrically-conductive carbon element 300 disposed therebetween. The aerosol precursor may be dispensed onto either of the two layers 450, 460, depending, for example, on the orientation of the assembly, and that layer thus functions as "the surface 425" of the heat-conductive substrate 400. In the case of the arcuate portions, the complementarily-interacting layers 450, 460 may each define a concavity, wherein the electrically-conductive element 300 may be disposed about the concavity between the two layers 450, 460. The assembly may then be oriented such that the aerosol precursor is dispensed into the concavity, which thus functions as "the surface 425" of the heat-conductive substrate 400.

In a further example aspect, as shown in FIG. 4, the heat-conductive substrate 400 may be configured as a hollow cylinder and having an inner surface 465 defining an inner channel 470, and wherein the carbon element 300 is engaged with an outer surface 475 of the hollow cylinder substrate 400. In such instances, the delivery device 500 may be configured and arranged to dispense the aerosol precursor onto or into engagement with the inner surface 465 of the hollow cylinder substrate 400, within the inner channel 470, wherein the inner surface 465 thus functions as "the surface 425" of the heat-conductive substrate 400. In such an arrangement, it may be preferred that the electrically-conductive carbon element 300 (i.e., the electrically conductive square graphene sheet) at least partially extends about the outer surface 475 of the hollow cylinder substrate 400. It may be further preferable, however, that the carbon element 300 does not wrap completely about the outer surface 475 of the hollow cylinder substrate 400.

That is, in some instances, the hollow cylinder substrate 400 may be oriented to require that the aerosol generated therein be drawn or extracted through the (side) wall of the hollow cylinder substrate 400. In such instances, the hollow cylinder substrate 400 is configured to define at least one pore 480 (one pore, or a plurality or series of pores) extending from the inner channel 470/inner surface 465 through to the outer surface 475 (i.e., through the side wall of the hollow cylinder). The at least one pore 480 is thus configured and arranged such that aerosol formed by the aerosol precursor dispensed onto the inner surface 465 of the hollow cylinder substrate 400, in response to heat from the electrically-conductive carbon element 300 conducted through the heat-conductive substrate 400, is dispensed through the at least one pore 480. Accordingly, in some aspects, the carbon element 300 is engaged with and about the outer surface 475 of the hollow cylinder substrate 400, opposite to the portion of the hollow cylinder substrate 400 defining the at least one pore 480.

In some aspects, as shown, for example, in FIG. 5, the carbon element 300 may be disposed between two concentric hollow cylinders 490, 495 formed of, for example, heat-conductive glass or suitable composite material, as the heat-conductive substrate 400. In those aspects, the concentric hollow cylinders 490, 495 are arranged so as to have the at least one pore 480 defined by the side walls thereof to be in registration for allowing passage of the formed aerosol therethrough.

As disclosed herein, the delivery device 500 may be operably engaged between the aerosol precursor source 144 and the heat-conductive substrate 400, and is configured to deliver the aerosol precursor from the aerosol precursor source 144 and onto the heat-conductive substrate 400. In some aspects, as shown, for example, in FIGS. 2-4, the delivery device 500 may comprise a capillary 550 in fluid communication with the aerosol precursor source 144 and extending into the inner channel 470 of the hollow cylinder substrate 400, or otherwise extending into proximity with (i.e., over) the surface 425 of the heat-conductive substrate 400 (i.e., a surface of one of the layers 450, 460 of the heat-conductive substrate 400). In the hollow cylinder arrangement, the delivery device 500 may thus be configured to deliver the aerosol precursor from the aerosol precursor source 144 onto the inner surface 465 of the heat-conductive hollow cylinder substrate 400, 490, within the inner channel 470. In delivering the aerosol precursor, the delivery device 500 may comprise, for example, a pump apparatus or a wick arrangement, though in some particular instances, the capillary 550 may be configured to siphon the aerosol precursor from the aerosol precursor source 144, and to dispense the aerosol precursor through an outlet end 560 thereof onto the inner surface 465 of the hollow cylinder substrate 400, 490 defining the inner channel 470, or otherwise onto the surface 425 of the heat-conductive substrate 400 (i.e., a surface of one of the layers 450, 460 of the heat-conductive substrate 400). In particular instances, the delivery device 500 and/or the heater device 250 may be configured to cooperate to maintain a certain volume of the aerosol precursor, or an amount of the aerosol precursor within a certain volume range, in engagement with the heat-conductive substrate 400, 490. For example, about 1 ml to about 3 ml of the aerosol precursor may be maintained in engagement with the heat-conductive substrate 400, 490.

Aspects of an aerosol formation apparatus 200, as disclosed herein, may be further implemented in an aerosol delivery device 100, for example, of the type disclosed herein. In one aspect, as shown in FIG. 6, such an aerosol delivery device 100 may comprise, for example, a control body 102, and a cartridge 104 serially engaged with the control body 102. The cartridge 104 may include an aerosol precursor source 144 housing an aerosol precursor, and may also define a mouth opening 128 configured to direct an aerosol therethrough to a user, the aerosol being formed from the aerosol precursor. A heater device 250, according to the various aspects disclosed herein, may be operably engaged with the cartridge 104, between the aerosol precursor source 144 and the mouth opening 128. The heater device 250 comprises an electrically-conductive carbon element 300 disposed adjacent to a heat-conductive substrate 400, as otherwise disclosed herein. The heater device 250 is configured to receive the aerosol precursor from the aerosol precursor source 144 onto the heat-conductive substrate 400, via a delivery device 500, such that the aerosol precursor on the heat-conductive substrate 400 forms the aerosol in response to heat from the electrically-conductive carbon element 300 conducted through the heat-conductive substrate 400. Otherwise, such aspects of the aerosol delivery device 100 disclosed herein may implement the various aspects of the aerosol formation apparatus 200 otherwise disclosed herein.

Other aspects, however, may be directed to the implementation of the aerosol formation apparatus 200 in the various aspects of the aerosol delivery device 100. For example, in some aspects, the heat-conductive substrate 400 is preferably disposed perpendicularly to a longitudinal axis of the cartridge 104. That is, the heat-conductive substrate 400, either in planar sheet or sheet-defining-a-concavity form, is disposed in the cartridge 104 such that the longitudinal axis thereof is perpendicular to the plane of the heat-conductive substrate 400. Alternately stated, the surface 425 of the heat-conductive substrate 400 is disposed opposite to the carbon element 300 and is directed toward the mouth opening 128. In regard to the hollow cylinder substrate 400, 490 form, the cylinder 490 may preferably be disposed such that the longitudinal axis thereof is disposed perpendicularly to the longitudinal axis of the cartridge 104, and such that the at least one pore 480 defined thereby is aligned and oriented toward the mouth opening 128. That is, in such instances, the carbon element 300 partially extends about the outer surface 475 of the hollow cylinder substrate 400, such that a remaining surface of the hollow cylinder substrate 400 not engaged with the carbon element 300, is directed toward the mouth opening 128. Moreover, the hollow cylinder substrate 400 is configured to define at least one pore 480 extending from the inner channel 465 through to the outer surface 475, wherein the at least one pore 480 is configured and arranged such that aerosol formed by the aerosol precursor dispensed onto the inner surface 465 of the hollow cylinder substrate 400, 490, in response to heat from the electrically-conductive carbon element 300 conducted through the heat-conductive substrate 400, 490, is dispensed through the at least one pore 480 toward the mouth opening 128.

FIG. 7 schematically illustrates a method of forming an aerosol delivery device. Such a method may comprise, for example, operably engaging an aerosol precursor source, housing an aerosol precursor, with a heater device including an electrically-conductive carbon element disposed adjacent to a heat-conductive substrate, wherein the heater device is configured to receive the aerosol precursor from the aerosol precursor source onto the heat-conductive substrate, such that the aerosol precursor on the heat-conductive substrate forms the aerosol in response to heat from the electrically-conductive carbon element conducted through the heat-conductive substrate (Block 700). Other aspects and/or steps of such a method of forming an aerosol delivery device are otherwise disclosed in connection with the disclosure of the various embodiments and aspects of such an aerosol delivery device otherwise addressed herein.

Aspects of the present disclosure may thus provide certain benefits and improvements to the types of smoking articles/aerosol delivery devices disclosed herein. For example, since certain aspects of the disclosure do not involve physical contact with the heater device, except for the aerosol precursor dispensed thereon, charring or other heat-related concerns associated with the device/apparatus for dispensing the aerosol precursor are reduced or eliminated. Further, by providing indirect contact between the electrically-conductive carbon element and the aerosol precursor (i.e., by disposing a heat-conductive substrate therebetween), issues related to interaction between the aerosol precursor and the carbon element such as, for example, short circuits, erosion, build-up, charring, or otherwise, are reduced or eliminated. The electrically-conductive carbon element, in conjunction with the hat-conductive substrate may further provide a faster heating/heat response time than other heating elements/arrangements, with improved (lesser) power consumption for increased power source life.

In light of possible interrelationships between aspects of the present disclosure in providing the noted benefits and advantages associated therewith, the present disclosure thus particularly and expressly includes, without limitation, embodiments representing various combinations of the disclosed aspects. Thus, the present disclosure includes any combination of two, three, four, or more features or elements set forth in this disclosure, regardless of whether such features or elements are expressly combined or otherwise recited in the description of a specific embodiment herein. This disclosure is intended to be read holistically such that any separable features or elements of the disclosure, in any of its aspects and embodiments, should be viewed as intended, namely to be combinable, unless the context of the disclosure clearly dictates otherwise.

Many modifications and other aspects of the disclosures set forth herein will come to mind to one skilled in the art to which these disclosures pertain having the benefit of the teachings presented in the foregoing descriptions and the associated drawings. For example, those of skill in the art will appreciate that embodiments not expressly illustrated herein may be practiced within the scope of the present disclosure, including that features described herein for different embodiments may be combined with each other and/or with currently-known or future-developed technologies while remaining within the scope of the claims presented here. Therefore, it is to be understood that the disclosures are not to be limited to the specific aspects disclosed and that equivalents, modifications, and other aspects are intended to be included within the scope of the appended claims. Although specific terms are employed herein, they are used in a generic and descriptive sense only and not for purposes of limitation.

The invention claimed is:

1. An aerosol delivery device, comprising:

a heater device operably engaged with a cartridge, the heater device comprising an electrically-conductive carbon element arranged to heat a heat-conductive substrate disposed adjacent thereto, the heater device being arranged for the heat-conductive substrate to receive an aerosol precursor into engagement therewith from an aerosol precursor source within the cartridge, the aerosol precursor being responsive to heat from the heat-conductive substrate to form an aerosol.

2. The device of claim 1, wherein the cartridge is adapted to serially engage a control body to form a smoking article, and wherein the cartridge defines a mouth opening opposite the engagement of the cartridge with the control body, the mouth opening being arranged to direct the aerosol from the heat-conductive substrate therethrough.

3. The device of claim 1, comprising a delivery device operably engaged between the aerosol precursor source and the heat-conductive substrate, the delivery device being arranged to deliver the aerosol precursor from the aerosol precursor source into engagement with the heat-conductive substrate.

4. The device of claim 1, wherein the electrically-conductive carbon element comprises an electrically-conductive graphene element.

5. The device of claim 1, wherein the electrically-conductive carbon element comprises an electrically-conductive square graphene sheet.

6. The device of claim 1, comprising an electrical circuit engaged with the carbon element, the carbon element being a resistive element arranged to generate the heat in response to application of an electrical current thereto from the electrical circuit.

7. The device of claim 1, wherein the aerosol precursor source is configured to dispense the aerosol precursor into engagement with a surface of the heat-conductive substrate, the surface of the heat-conductive substrate being opposite to the carbon element and the surface being in in fluid communication with the mouth opening for the formed aerosol to be directed thereto.

8. The device of claim 3, wherein the delivery device comprises a pump apparatus or a wick arrangement.

9. The device of claim 1, wherein the heat-conductive substrate comprises a heat-conductive glass, a thermally-conductive dielectric material, or a heat-conductive composite material.

10. The device of claim 1, wherein the carbon element is disposed between two layers of the heat-conductive substrate.

11. The device of claim 1, wherein the heat-conductive substrate is disposed perpendicularly to a longitudinal axis of the cartridge.

12. The device of claim 1, wherein the heat-conductive substrate is a hollow cylinder defining an inner channel, and wherein the carbon element is engaged with an outer surface of the hollow cylinder.

13. The device of claim 12, wherein the carbon element extends at least partially about the outer surface of the hollow cylinder, and wherein a remaining surface of the hollow cylinder, not engaged with the carbon element, is in fluid communication with the mouth opening for the formed aerosol to be directed thereto.

14. The device of claim 1, wherein the carbon element is disposed between two concentric hollow cylinders of the heat-conductive substrate.

15. The device of claim 1, wherein the heat-conductive substrate is a hollow cylinder defining an inner channel, and wherein the carbon element is engaged with an inner surface of the hollow cylinder.

16. The device of claim 15, wherein the carbon element extends at least partially about the inner surface of the hollow cylinder such that an outer surface of the hollow cylinder overlying the carbon element is in fluid communication with the mouth opening for the formed aerosol to be directed thereto.

17. The device of claim 12, comprising a delivery device operably engaged between the aerosol precursor source and the heat-conductive substrate, the delivery device being a capillary in fluid communication with the aerosol precursor source and extending therefrom into the inner channel of the hollow cylinder, the delivery device being arranged to deliver the aerosol precursor from the aerosol precursor source into engagement with the heat-conductive substrate within the inner channel.

18. The device of claim 17, wherein the capillary is arranged to siphon the aerosol precursor from the aerosol precursor source, and to dispense the aerosol precursor through an outlet end thereof into engagement with an inner surface of the hollow cylinder defining the inner channel.

19. The device of claim 17, wherein the hollow cylinder defines at least one pore extending from the inner channel through to the outer surface, the at least one pore being arranged such that aerosol formed by the aerosol precursor dispensed into engagement with the inner surface of the hollow cylinder, in response to heat from the electrically-conductive carbon element conducted through the heat-conductive substrate, is dispensed through the at least one pore in fluid communication with the mouth opening for the aerosol to be directed thereto.

20. The device of claim 1, wherein the carbon element has a resistance of 3 Ohms/square unit.

21. An aerosol formation apparatus, comprising:

a heater device including an electrically-conductive carbon element arranged to heat a heat-conductive substrate disposed adjacent thereto, the heater device being arranged for the heat-conductive substrate to receive an aerosol precursor into engagement therewith from an aerosol precursor source, the aerosol precursor being responsive to the heat from the heat-conductive substrate to form an aerosol.

22. The apparatus of claim 21, comprising a delivery device operably engaged between the aerosol precursor source and the heat-conductive substrate, the delivery device being arranged to deliver the aerosol precursor from the aerosol precursor source into engagement with the heat-conductive substrate.

23. The apparatus of claim 21, wherein the electrically-conductive carbon element comprises an electrically-conductive graphene element.

24. The apparatus of claim 21, wherein the electrically-conductive carbon element comprises an electrically-conductive square graphene sheet.

25. The apparatus of claim 21, comprising an electrical circuit engaged with the carbon element, the carbon element being a resistive element arranged to generate the heat in response to application of an electrical current thereto from the electrical circuit.

26. The apparatus of claim 21, wherein the aerosol precursor source is arranged to dispense the aerosol precursor into engagement with a surface of the heat-conductive substrate, the surface of the heat-conductive substrate being opposite to the carbon element.

27. The apparatus of claim 22, wherein the delivery device comprises a pump apparatus or a wick arrangement.

28. The apparatus of claim 21, wherein the heat-conductive substrate comprises a heat-conductive glass, a thermally-conductive dielectric material, or a heat-conductive composite material.

29. The apparatus of claim 21, wherein the carbon element is disposed between two layers of the heat-conductive substrate.

30. The apparatus of claim 21, wherein the heat-conductive substrate is a hollow cylinder defining an inner channel, and wherein the carbon element is engaged with an outer surface of the hollow cylinder.

31. The apparatus of claim 30, wherein the carbon element extends at least partially about the outer surface of the hollow cylinder.

32. The apparatus of claim 21, wherein the carbon element is disposed between two concentric hollow cylinders of the heat-conductive substrate.

33. The apparatus of claim 21, wherein the heat-conductive substrate is a hollow cylinder defining an inner channel, and wherein the carbon element is engaged with an inner surface of the hollow cylinder.

34. The apparatus of claim 33, wherein the carbon element extends at least partially about the inner surface of the hollow cylinder.

35. The apparatus of claim 30, comprising a delivery device operably engaged between the aerosol precursor source and the heat-conductive substrate, the delivery device being a capillary in fluid communication with the aerosol precursor source and extending into the inner channel of the hollow cylinder, the delivery device being arranged to deliver the aerosol precursor from the aerosol precursor source into engagement with the heat-conductive substrate within the inner channel.

36. The apparatus of claim 35, wherein the capillary is arranged to siphon the aerosol precursor from the aerosol precursor source, and to dispense the aerosol precursor through an outlet end thereof into engagement with an inner surface of the hollow cylinder defining the inner channel.

37. The apparatus of claim 35, wherein the hollow cylinder defines at least one pore extending from the inner channel through to the outer surface, the at least one pore being arranged such that aerosol formed by the aerosol precursor dispensed into engagement with the inner surface of the hollow cylinder, in response to heat from the electrically-conductive carbon element conducted through the heat-conductive substrate, is dispensed through the at least one pore.

38. The apparatus of claim 21, wherein the carbon element has a resistance of 3 Ohms/square unit.

* * * * *